United States Patent [19]

Hanamoto et al.

[11] Patent Number: 4,500,957
[45] Date of Patent: Feb. 19, 1985

[54] TIMING CONTROL SYSTEM FOR DETERMINING ABNORMAL MOTOR OPERATION

[75] Inventors: Hiroyuki Hanamoto; Yoshihiro Horie, both of Toyokawa, Japan

[73] Assignee: Minolta Camera Kabushiki Kaisha, Osaka, Japan

[21] Appl. No.: 360,989

[22] Filed: Mar. 23, 1982

[30] Foreign Application Priority Data

Mar. 27, 1981 [JP] Japan ................................. 56-45812

[51] Int. Cl.³ ..................... G06F 15/00; G03G 15/00
[52] U.S. Cl. .................................... 364/200; 364/900; 364/518; 364/431.1; 355/14 C; 355/14 R; 371/30
[58] Field of Search ............... 364/518, 200 MS File, 364/900 MS File, 431.1; 371/29, 30; 355/14 C, 355/14 R

[56] References Cited

U.S. PATENT DOCUMENTS

| | | | |
|---|---|---|---|
| 3,969,703 | 7/1976 | Kwiatkonski | 364/900 |
| 4,104,726 | 8/1978 | Fisk et al. | 371/20 |
| 4,162,396 | 7/1979 | Howard et al. | 355/14 C |
| 4,203,663 | 5/1980 | Ogura et al. | 355/14 C |
| 4,214,833 | 7/1980 | Kono | 355/14 C |
| 4,224,664 | 9/1980 | Trinchien | 364/200 |
| 4,269,500 | 5/1981 | Ito et al. | 355/14 C |
| 4,280,763 | 7/1981 | Arai et al. | 355/14 C |
| 4,282,574 | 8/1981 | Yoshida et al. | 364/431.1 |
| 4,322,847 | 3/1982 | Dodge et al. | 355/14 C |
| 4,343,036 | 8/1982 | Shimizu et al. | 371/20 |
| 4,375,917 | 3/1983 | Hiraike et al. | 355/14 C |

Primary Examiner—Jerry Smith
Assistant Examiner—John R. Lastova
Attorney, Agent, or Firm—Jackson, Jones & Price

[57] ABSTRACT

A control system for a machine includes a pulse generator for generating a pulse signal synchronized with the speed of drive of the machine and a programmed control device for receiving the pulse signal and controlling the sequence of operation of the machine thereby to synchronize the control operation of the control device and the actual operation of the machine with each other. For this purpose a program of the programmed control device is so designed that a control routine for executing a process necessary to control the machine and a synchronizing routine for controlling the timing at which said control routine is to be started are executed continuously and repeatedly. The routine of the program are so associated with the pulse generator that the number of pulses generated at a speed corresponding to the normal run of the machine during the time equal to the sum of the control routine and the synchronizing routine is at least two. The control routine is started immediately after the generation of the pulse during the execution of said synchronizing routine has been detected.

7 Claims, 10 Drawing Figures

4,500,957

TIMING CONTROL SYSTEM FOR DETERMINING ABNORMAL MOTOR OPERATION

BACKGROUND OF THE INVENTION

The present invention generally relates to a control system for a machine and, more particularly, to a control system for a operating machine of a type that is program-controlled by a microcomputer or the like.

When it comes to the sequence control of the operation of a machine by the use of a programmed control device such as a microcomputer, a control signal derived from the programmed control device must be synchronized with the actual operation of the machine having variables including the voltage, the load torque and the like.

The Japanese Laid-open Patent Publication No. 54-141134, laid open to public inspection on Nov. 2, 1979 and corresponding to the U.S. Pat. No. 4,280,763, discloses a control system effective to achieve the requisite synchronization. Briefly speaking, the control system of this publication comprises, as shown in FIG. 1 of the accompanying drawings, a rotary disc 4 mounted on a rotary shaft 2' of a drive system of the machine including a motor 1 for rotation together therewith and having a plurality of slits 3 defined therein, a light emitting element 5 and a photo sensor 6 so positioned on one side of the rotary disc 4 opposite to the light emitting element 5 that, during the rotation of the rotary disc 4 in synchronism with the motor 1, a beam of light travelling from the element 5 towards the sensor 6 can be cyclically intercepted with the sensor 6 consequently generating a train of pulses of a frequency equal to the cycle of interception of the beam of light passing through the slits 3, which is an indication of the speed of rotation of the motor 1. According to this prior art control system, the minimum possible value tl of the pulse cycle t (which corresponds to the maximum possible speed of rotation of the motor) is so selected to be greater than the time required for the programmed control device to complete its execution of one routine so that, after the pulse signal has been supplied from the photo sensor 6, the programmed processing routine can be looped or actuated.

In this prior art control system, so long as the machine is operated by the motor 1, the programmed processing routine for the programmed control apparatus can be maintained exactly synchronized with the actual operation of the machine even though the driving speed of the motor fluctuates. On the other hand, when and so long as the motor 1 is held in a standstill position, that is, when and so long as the operation of the machine need not be synchronized with the control signal derived from the programmed control device, the programmed processing routine can be looped in response to or immediately after the time-up of an internal timer (a digital timer for counting the number of reference clock pulses) provided in the programmed control device for defining the time during which the above described programmed processing routine must be completed.

Apart from the above, a system effective to check if the motor 1 is normally operated by the utilization of the feature that the pulse signal is generated in synchronism with the drive of the motor 1 is disclosed in the Japanese Laid-open Patent Publication No. 55-90967, of the same applicant, laid open to public inspection on July 10, 1980 and corresponding to the U.S. Pat. No. 4,269,500. Briefly speaking, the system disclosed therein is such that, after the execution of the process necessary to rotate the motor, a predetermined timer for the pulse checking is set to operate and in the event that no pulse signal is detected within a predetermined time set to the timer, the motor is determined as rotating in an abnormal condition.

In the control system referred to above wherein the pulse signal synchronized with the rotation of the motor (which pulse signal is hereinafter referred to as a motor pulse) is utilized, since the speed of rotation of the motor during any one of the starting or start-up period and the stopping or run-down period of the motor is different from that during the normal running period thereof, the routine is executed only by the internal timer built in the programmed control device during the start-up and run-down periods of the motor without utilizing the pulse signal even though such pulse signal has been generated upon rotation of the motor, as is the case when the motor is held in a standstill position. More specifically, an arrangement has been made such that, when a start signal has started the rotation of the motor, a timer having a preset time equal to the time apparently required for the motor to pass over the start-up period is activated, and the above described motor pulse is associated with the programmed control immediately after the preset time of the timer is passed over and, when an off signal for inactivating the motor is generated, the internal timer supersedes such timer.

However, since the speed of rotation of the motor tends to be largely affected by the load torque and the voltage, a delay time for the synchronization especially during the start-up period of the motor must be long enough to account for a safety purpose and, therefore, it requires a long time for a predetermined operation to be initiated. If the motor pulse detecting timing is accelerated in order to obviate the above described drawback, another disadvantage occurs in that, even though the motor has been rotated, the motor would be determined as operating in an abnormal condition if the starting of the motor is somewhat irregular.

SUMMARY OF THE INVENTION

The present invention has been developed with a view to substantially eliminating the above described disadvantages and inconveniences inherent in the prior art control systems and has for its essential object to provide an improved control system for a machine wherein the program for the programmed control apparatus is so designed that a control routine for executing the process of control of the machine and a synchronizing routine for controlling the timing at which the control routine is to be started can be continuously executed in such a manner that the cycle of the motor pulses are so relatively shortened as to render the program routine as a whole to correspond to a plurality of the motor pulses so that the control routine can be started during the execution of the synchronizing routine by the detection of the motor pulses. By so doing, the determination of the condition of the motor during its start-up period can readily be done at an earlier stage without impairing the synchronized relationship between the control signal and the drive system as determined by the program. According to the present invention, there provides a control system for a machine including a programmed control device for controlling the sequence of operation of the machine, and a pulse generating means for generating a pulse signal synchronized with the speed of drive of the machine, said pulse signal being supplied to the programmed control device for synchronizing the control operation, which is performed by the programmed control device and the actual operation of the machine with each other. Said control system providing an arrangement wherein a program of the programmed control device is so designed that a control routine for executing a process necessary to control the machine and a synchronizing routine for controlling the timing at which said control routine is to be started are executed continuously and repeatedly. Said routines of said programme being so associated with said pulse generating means that the number of pulses generated at a speed corresponding to the normal operation of the machine during the time equal to the sum of the control routine and the synchronizing routine is at least two, said control routine being started immediately after the generation of said pulse, during the execution of said synchronizing routine, has been detected.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE INVENTION

Figure 1:
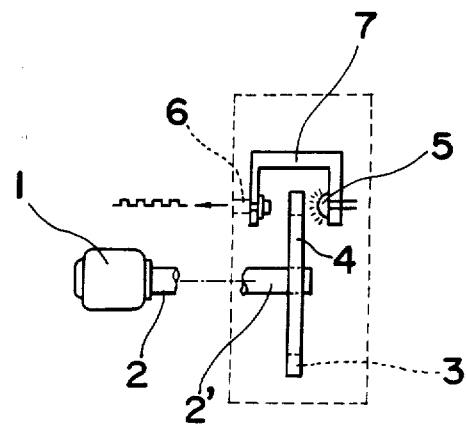
FIG. 1 is a schematic diagram showing a mechanism for generating a pulse signal in synchronism with the drive of the motor.

Before the description of the present invention proceeds, it is to be noted that like parts are designated by like reference numerals throughout the accompanying drawings.

In the first place, the structure and operation of an electrophotographic copying machine to be controlled by a microcomputer will briefly be described with reference to FIG. 2 as an example of the machine to which the control system of the present invention is applied.

Figure 2:
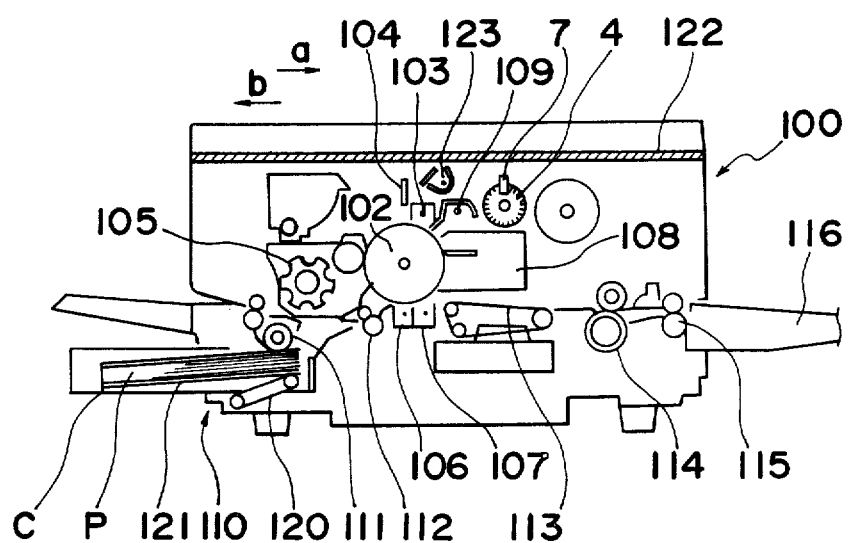
FIG. 2 is a schematic side view of an electrophotographic copying machine shown as an example of a machine to which the control system of the present invention is applicable.

The copying machine, generally identified by 100, comprises a photoreceptor drum 102 supported inside the machine proper for rotation in one direction, for example, counterclockwise as viewed in FIG. 2. As is well known in the art, the photoreceptor drum 102 is, during one complete rotation thereof, moved sequentially past a charging station, at which a uniform electrostatic charge is deposited on the photosensitive outer peripheral surface of the drum 102 by a charger 103; an exposure station at which an image of the original to be copied is projected onto the drum surface through an optical system 104, including an image transmitting array of bundled optical fibers, to form an electrostatic latent image corresponding to the image of the original to be copied; a developing station at which the electrostatic latent image is rendered visible in the form of a powder image by the use of a toner material supplied from a developing device 105; a transfer station at which a transfer charger 106 and an AC discharger 107 is installed for effecting the transfer of the powder image on the drum surface onto a copying paper; a cleaning station at which a cleaning device 108 is installed for removing the residual powder from the drum surface; and an erasing station at which the drum surface is exposed to an eraser lamp 109 to effect complete discharge of any residual electrostatic charge.

Copying papers P are successively fed one at a time towards the transfer station in synchronism with the rotation of the photoreceptor drum 102. More specifically, copying paper P are accommodated in a stacked manner within a cassette C loaded in a paper supply unit 110. As a bottom plate 121 within the cassette C is upwardly shifted by a lifting member 120, the uppermost copying paper in the paper stack is forced to contact a feed roller 111 and, therefore, when the feed roller 111 is rotated, the paper is fed out of the cassette C and towards the transfer station. The copying paper P being so fed towards the transfer station is temporarily brought to a halt by a timing roller 112 which is subsequently driven in response to a suitable timing signal to feed the copying paper therethrough so that the arrival of the copying paper P at the transfer station can be synchronized with that of the photoreceptor drum 102 being rotated. At the transfer station, the powder image on the drum surface is transferred onto the copying paper P, and the copying paper with the powder image thereon is subsequently separated from the drum 102 by the A.C. discharger 107. The copying paper P with the powder image thereon is then transferred onto a transport belt 113 by which it is passed through a fixing device 114 in which the powder image on the copying paper P is fixed in a known manner. Finally, the copying paper emerging from the fixing device 114 is ejected through an ejecting roller assembly 115 onto a tray 116.

The original (not shown) to be copied is adapted to be placed on a transparent support 122 reciprocally and movably supported on the top of the machine proper and is adapted to be illuminated by an illuminating lamp 123 from below while being moved from a start position towards a scanned position. The image of the original so illuminated by the lamp 123 is projected onto the outer peripheral surface of the drum 102 through the optical system 104. However, in the machine 100 so far shown, the transparent support 122 is so designed that, while it is normally held at an intermediate position, as shown in FIG. 2, between the start and scanned positions when and so long as a print start button has not yet been manipulated and, therefore, the machine is in an inoperative condition, the transparent support 122 can be moved to the start position in a direction shown by, a, in response to the manipulation of the print start button prior to being moved from the start position towards the scanned position in the opposite direction shown by b. The movement of the transparent support from the start position towards the scanned position takes place automatically immediately after the transparent support 122 has arrived at the start position from the intermediate position. The supply of the copying paper P is initiated in unison with the start of movement of the transparent support 122 from the start position towards the scanned position.

For controlling the sequence of a copying operation of the copying machine 100, the machine 100 incorporates microcomputer 200, as will be described later, with which the determination of whether or not the copying papers P in the cassette C have been completely consumed and whether or not the copying paper being supplied has been jammed in a paper supply passage leading from the supply unit 110 to the tray 116 through the transfer station and then through the fixing device 114 can be done.

As has been described with reference to FIG. 1, a rotary disc 4 having a plurality of equally spaced radial slits 3 defined therein for generating pulses is utilized in the machine 100. This rotary disc 4 is rotatable in synchronism with a drive motor 1 and is so operatively associated with a photo interrupter 7 as to generate during the rotation of the rotary disc 4 a pulse signal which is to be supplied to the microcomputer 200 to make the copying operation of the microcomputer 200 synchronize with the control performed by the microcomputer 200. Also, by the utilization of this motor pulse, check is made as to the rotating condition of a motor. Both this synchronization and the check of the rotating condition of the motor accomplishes the intended object or objects sufficiently. However, in a copying machine of a type wherein the motor 1 starts its rotation in response to the manipulation of the print start button, a delay timer is used for detecting the rotational condition of the motor during its start-up period, as hereinbefore discussed. In this machine, if the delay time to be set by the delay timer is too long, the time required to complete the first copy is correspondingly prolonged, thereby posing a problem in the practical applicability of the machine.

Figure 3:
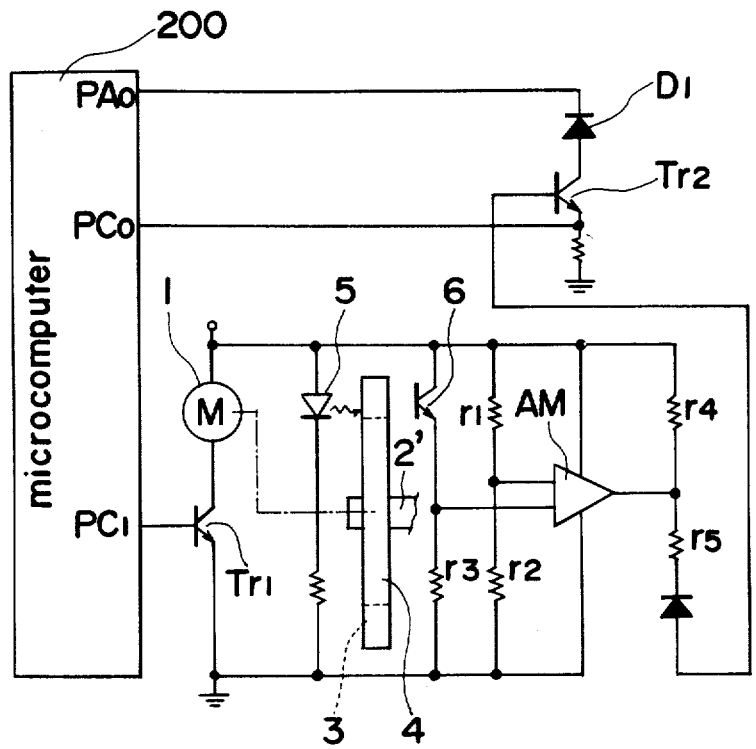
FIG. 3 is a schematic circuit diagram showing the relationship between a microcomputer and a pulse generating mechanism.

FIG. 3 illustrates an example of an electrical circuit in which the microcomputer 200 is electrically connected with the motor pulse generating mechanism shown in FIGS. 1 and 2.

The microcomputer 200 has an output port PCl from which a drive control signal to be applied to the drive motor 1 is generated for controlling a switching transistor Tr1, and another output port PCo which is connected to an input port PAo through a switching transistor Tr2, adapted to be controlled by an output from a differential amplifier AM for the generation of the motor pulse, and then through a diode D1 and from which a signal for the detection of the motor pulse is generated.

When the rotary disc 4 is rotated in synchronism with the motor 4, a beam of light emitted from a light emitting element 5 reaches a photo sensor 6 as each of the slits 3 aligns with the path of travel of such light beam from the element 5 to the sensor 6, thereby causing the internal resistance of the sensor 6 to vary. Accordingly, the state of an output from the amplifier AM varies between when the light beam is received by the sensor 6 and when it is not received by the sensor 6 and, by controlling the transistor Tr2 according to the state of the output from the amplifier AM, the generation of the motor pulse can be detected.

Figure 4:
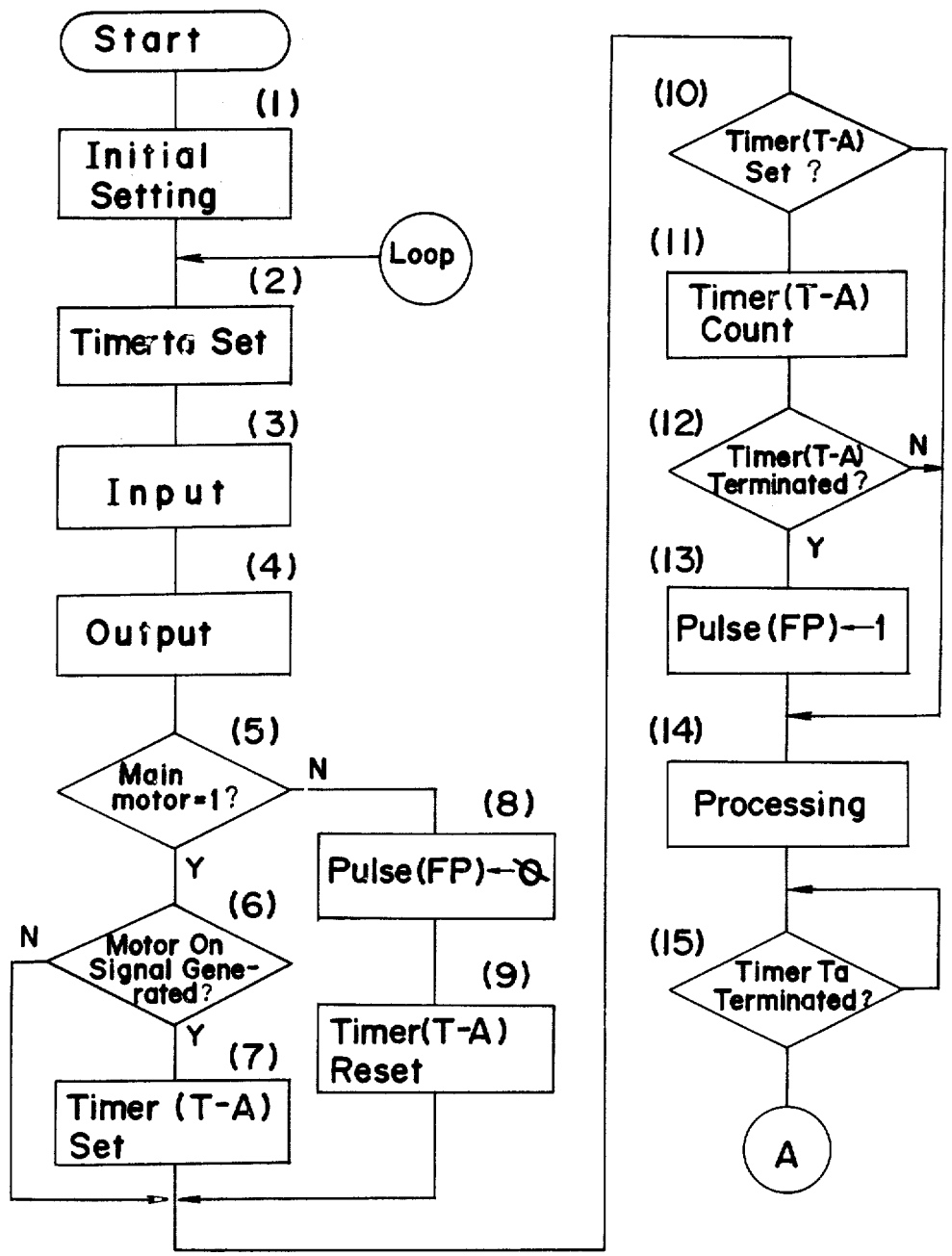
FIGS. 4(a), 4(b) and 4(c) jointly constitute FIG. 4 and illustrate a flow chart showing the sequence of the programmed processing performed by the microcomputer.

The flow chart shown in FIG. 4 illustrates the sequence of the processing performed according to a program stored in a memory built in the microcomputer.

Referring first to FIG. 4(a), when a main power switch of the machine is turned on, not only is the machine fed with electrical power, but a control device including the microcomputer 200 is also fed with the electrical power with the microcomputer 200 consequently starting its control operation.

At the step ①, the initial setting is performed including the procedure to make a display unit show a digit "1" which represents the desired number of copies to be made and the procedure to set an exposure parameter to a standard level. This initial setting is excuted by data stored in the memory. At this step ①, a random access memory (RAM) is also cleared with all of the flags rendered "0" and all of the timers are reset.

FIG. 4(a) illustrates a control routine in the program of the microcomputer 200 and, at the step ②, a first internal timer ta for defining a time for this control routine is set. It is to be noted that internal timers herein referred to, including the internal timer ta recited above, are all digital timers each capable of performing a time counting operation in such a way as to count the number of reference clock pulses providing a unit reference for the control of the microcomputer 200, and are constituted by the utilization of registers in the microcomputer 200. Separately from the internal timers, a timer providing a reference to a timing signal for the control associated with the copying operation, such as a delay timer T-A as will be described later, is so designed by the utilization of the memory in the microcomputer as to be counted up at each routine of the program.

At the step ③, the conditions of all of input switches and others of the copying machine are scanned. At the subsequent step ④, the process for the output control for all of the loads and displays is performed.

At the step ⑤, the condition of the motor 5 is determined and the step ⑥ is such that the determination is made as to whether an operation initiating signal thereof has been received. In other words, at the step ⑥, a signal generated as a result of a manipulation to drive the motor 1, (e,g., as a result of the manipulation of the print start button,) is checked as to whether or not it has been detected at the begining of this routine while the motor 1 is set in a driving condition. This step ⑥ is followed by the step ⑦, if the signal so checked is received, to set the delay timer T-A. However, if the motor 1 is determined not in the driving condition at the step ⑤, the step ⑤ is followed by the step ⑧ during which the pulse flag FP is rendered "0", and subsequently by the step ⑧ during which the timer T-A is reset. The resetting of the timer T-A during the step ⑨ is carried out with due consideration paid to the fact that, after the motor 1 has been driven, the timer T-A is turned off during its operation.

At the step ⑩, a check is made as to whether the delay timer T-A has been set or not and, if it is found that the timer has been set, the count-up process is executed at the step ⑪. At the subsequent step ⑫, the termination of the timer T-A is determined and, at the time of termination of the timer T-A, the pulse flag FP is rendered "1" at the step ⑬ thereby providing conditions to be determined during the execution of a synchronizing routine shown in FIG. 4(b). The step ⑭ includes all processes necessary to control the copying operation of the machine 100.

Figure 4B:
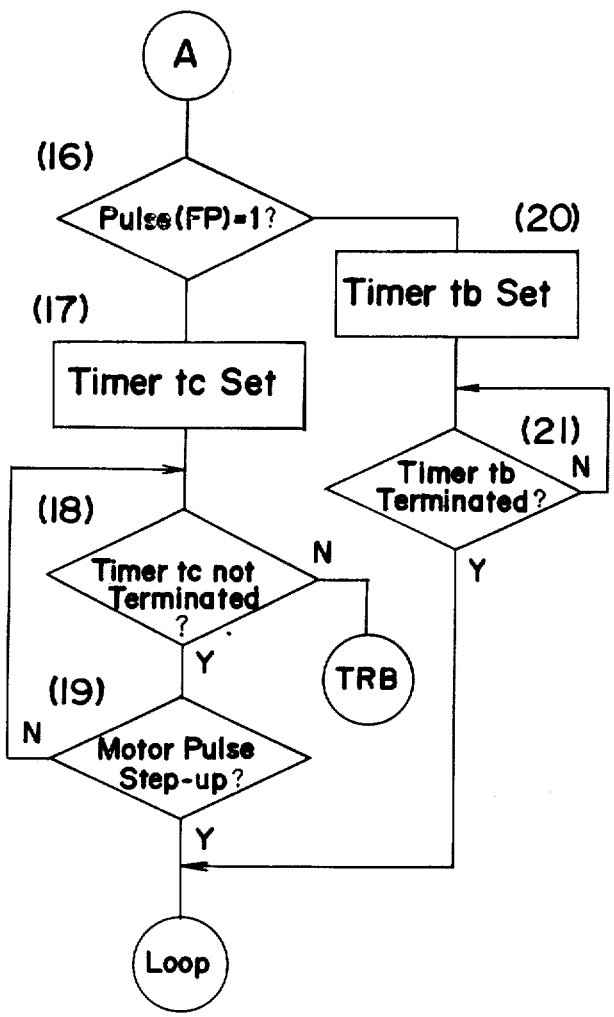

After the termination of the first internal timer ta described hereinbefore, the step ⑮ is followed by the synchronizing routine shown in FIG. 4(b). In other words, the internal timer ta has a preset time which is somewhat longer than the time required to complete an actual process in order to fix at a constant value the time required to process the control routine, and this control routine is followed by the synchronizing routine after the termination of the internal timer ta as determined at the step ⑮ . More specifically, although the details are described later, the preset time of the timer ta is selected to be about 15 msec. while the cycle of the motor pulse during the normal rotation of the motor is approximately 10 msec.

FIG. 4(b) illustrates the synchronizing routine to be executed in continuation to the termination of the internal timer ta at the step ⑮ shown in FIG. 4(a).

At the step ⑯ , the determination of the pulse flag FP is carried out and, if it is found to be 0", the step ⑯ is followed by the step ⑳ during which a second internal timer tb is set. However, if the pulse flag FP is found to be "1" at the step ⑯ , the latter is followed by the step ⑰ during which a third internal timer tc for the determination of the motor pulse is set.

Where the second internal timer tb has been set, this fact is determined at the step ㉑ and, immediately thereafter, the step ㉑ is looped back to the step ㉑ . On the other hand, where the third internal timer tc has been set, the termination thereof is determined at the step ⑱ and, at the step ⑲ , the generation of the motor pulse (the step-up of the signal) is determined. Should the step-up of the motor pulse fail to be detected within a preset time of the timer tc, a routine shown in FIG. 4, which is used when trouble occurs is executed. In other words, when the pulse flag FP is "0", this means that the motor is not in the driving condition or the delay time of the timer T-A has not yet elapsed, and in this case, the program processing routine is looped in a time determined by the internal timers ta and tb. However, when the pulse flag FP is "1", this means that the motor is in the driving condition and the delay timer T-A has terminated. In this case, the internal timer tc starts subsequent to the termination of the internal timer ta, the program processing routine is looped by the detection of the step-up of the motor pulse during the continuance of the timer tc, and the failure to detect the motor pulse within the preset time of the timer tc is determined as meaning of an abnormal rotation. During the normal run of the motor, the motor pulse is so set as to have a cycle substantially equal to the time in the case during which the loop is effected by the internal timer tb.

Figure 4C:
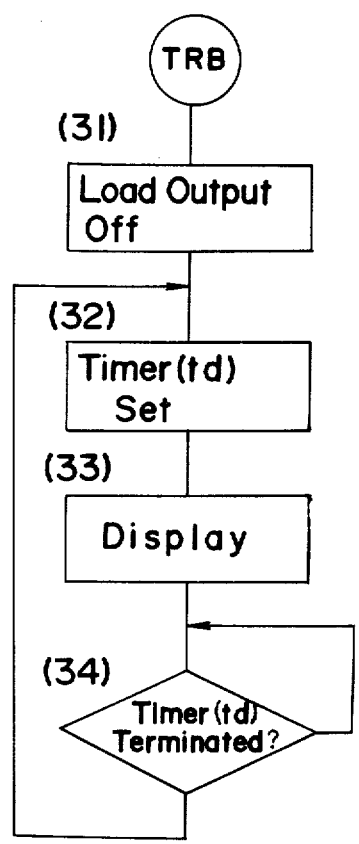

FIG. 4(c) illustrate the routine to be used when the trouble has been detected. In this routine, a load output is turned off at the step ㉛ , an internal timer td for defining the processing time of one routine for the display mainly of the occurrence of a trouble is set at the step ㉜ , the process of displaying the output thereof is executed at the step ㉝ , and the trouble routine is looped at the step ㉞ after the termination thereof.

FIGS. 5 to 8 illustrate respective relationships among the various timers shown in the flow chart of FIG. 4.

Figure 5:
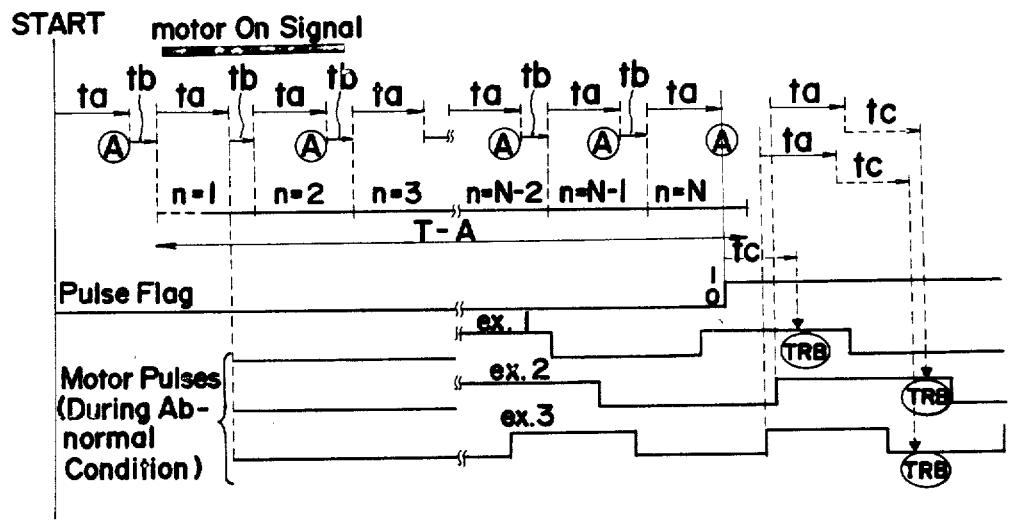
FIG. 5 is a time chart used for the explanation of the process shown in the flow chart of FIG. 4.

Referring to FIG. 5, when the programmed process starts, various processes are repeated by the internal timers ta and tb until a motor on signal is inputted. These processes include those necessary to display the desired numbers of copies to be made and to adjust the temperature of a heater of the fixing device.

When an input manipulation is carried out to supply the motor on signal to the motor 1, the first count-up (n=1) of the delay timer T-A takes place in the internal timer ta for the control routine and, thereafter, until (n=N) is established, the processes are executed by the internal timers ta and tb. When (n=N) is established, the pulse flag FP is rendered "1" in response to the termination of the internal timer ta and the internal timer tc is set. If at this time the start-up of the motor 1 is irregular, no pulse step-up is detected before the termination of the timer tc and, therefore, it is determined that an abnormal condition has occurred (ex. 1, ex 2, ex. 3).

Figure 6:
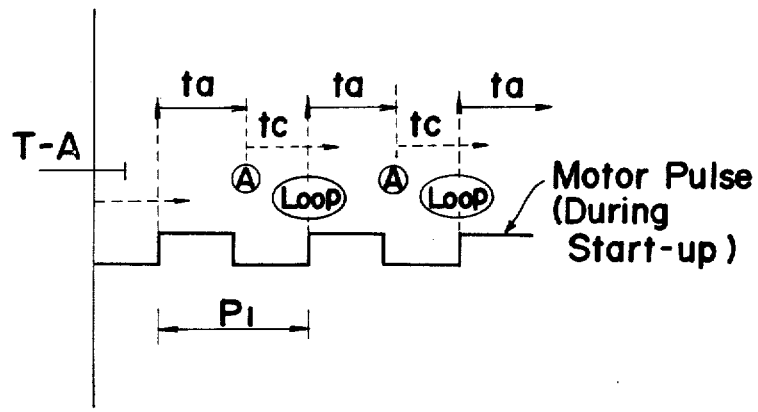
FIGS. 6 to 8 are time charts, respectively, illustrating the relationship between an internal timer in the microcomputer and the cycle of the motor pulses.

However, where the motor steps up at about a pitch shown by Pl in FIG. 6 at the time of the termination of the timer T-A, only one motor pulse is detected during the continued operation of the internal timer tc and, therefore, the motor 1 is not determined as operating irregularly.

Figure 7:
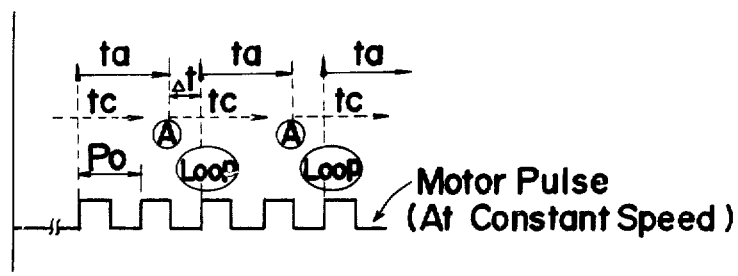
Figure 8:
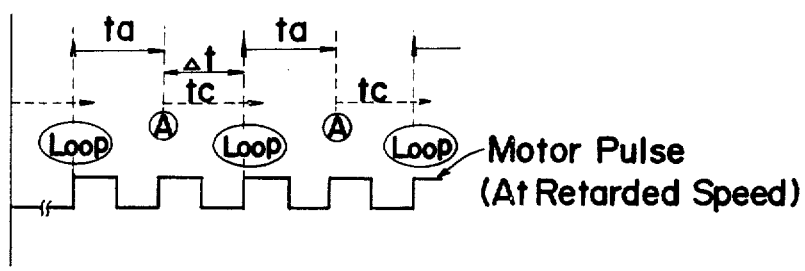

On the other hand, the motor pulses are so defined as to correspond to two pulses per one programmed process during the normal run of the motor 1 (with the pitch shown by Po) as shown in FIG. 7 and has a pulse cycle shorter than the internal timer ta. A slight deviation of the speed of rotation of the motor 1 can be compensated for by the variation of a stand-by time $\Delta t$ utilizing, for example, the motor pulse and the internal timer tc as shown in FIG. 8 and, therefore, an exact synchronization between the drive system and the programmed control can be maintained.

It is to be noted that, as shown in FIG. 7, the stand-by time $\Delta t$ is so selected as to be substantially equal to the internal timer tb during the normal run of the motor 1.

Thus, since each two of the motor pulses including the stand-by time $\Delta t$ is made to correspond to one routine of the programmed process, where the start-up of the motor 1 is somewhat irregular as is the case shown in FIG. 6, a normal routine can be executed by making one motor pulse correspond to one routine and, therefore, the margin for time of the delay timer T-A can be considerably shortened as compared with that in the conventional system. In other words, while according to the prior art, the motor tends to be determined as in an abnormal condition when the start-up thereof is somewhat irregular despite the fact that the motor is rotated, the present invention is such that, by, for example, doubling the motor pulse, the rotation thereof can exactly be detected and, if the two pulses are made to correspond to one routine during the normal operation of the motor, the synchronization with the drive system can exactly be attained as is the case with the conventional system.

Assuming that the internal timers ta, tb and tc are set at 15 msec., 5 msec., and 15 msec., respectively and that the cycle Po of the motor pulse during the normal run of the motor 2 is 10 msec., the abnormal condition would be detected at a value not more than $\frac{2}{3}$ of the speed of the motor 1 during the normal run in the conventional case wherein the cycle of the motor pulse is twice (20 msec.) and one motor pulse corresponds to one routine. However, in the present invention, the abnormal condition of the motor can be detected at a value $\frac{2}{3}$ of the normal running speed of the motor and, therefore, the system of the present invention is extremely advantageous in the detection of the rotation of the motor. Therefore, the preset time of the timer T-A can be shortened so much and, in the copying machine, the time required to complete the first copy can advantageously be reduced.

From the foregoing, it has now become clear that the present invention pertains to a machine of a type, the operation of which is controlled by the programmed control device in such a manner as to generate a pulse signal synchronized with the driving speed of the machine to make the operation of the machine synchronize with the programmed control and is characterized in that a control routine for executing the process of control of the machine and a synchronizing routine for controlling the timing at which the control routine is to be started can be continuously executed such that the program routine as a whole is rendered to correspond to a plurality of pulses for the synchronization during a normal run of the machine. The control routine can be started during the execution of the synchronizing routine by the detection of the pulses for the synchronization. By so doing, the determination of the condition of the motor during its start-up period can readily be done at an earlier stage without impairing the synchronized relationship between the control signal based on the programme and the drive system. Thus, with the control system of the present invention, the stand-by time during which the start of the operation of the machine is to be delayed temporarily for the purpose of synchronization can advantageously be reduced.

Although the present invention has fully been described in connection with the preferred embodiment with reference to the accompanying drawings, it is to be noted that various changes and modifications are apparent to those skilled in the art. Such changes and modifications are to be understood as included within the true scope of the present invention unless they depart therefrom.

We claim:

1. In a control system for a machine including a programmed control device for controlling the sequence of operation of the machine, and a pulse generating means for generating pulse signals synchronized with a speed of a drive of the machine, said pulse signals being supplied to the programmed control device for synchronizing a control operation, which is performed by the programmed control, device with actual operation of the machine, the improvement wherein a program of the programmed control device is so designed that a control routine for executing a process necessary to control the machine and a synchronizing routine for controlling a time at which said control routine is to be started are executed continuously and repeatedly, said routines of said program being so associated with said pulse generating means that a number of pulses generated, when the machine is driven at a normal speed during a time period equal to a time required for completion of a succession of the control routine and the synchronizing routine, is at least two and that, said control routine is started immediately after generation of one of said pulses, during execution of said synchronizing routine, has been detected.

2. A control system as claimed in claim 1, wherein said programmed control device includes a timer means for defining a time required to execute the control routine, said timer means having a predetermined time period so associated with the pulse generating means that a time defined by the timer means is longer than a cycle of a pulse generated during normal operation of the machine.

3. A control system as claimed in claim 1, wherein the machine is detected as operating in an abnormal condition when the speed of the drive of the machine is retarded to such an extent that a cycle of one of said pulses becomes longer than a time equal to a sum of program execution times of the control and synchronizing routines.

4. A control system as claimed in claim 1, wherein the speed of the drive of the machine is lower than a speed occurring during a normal operation thereof and when a time cycle of one of said pulses is smaller than a time equal to a sum of program execution times of the control and synchronizing routines, said control routine is started in response to generation of the pulse during an execution of the synchronizing routine.

5. A control system as claimed in claim 2, wherein the machine is detected as operating in an abnormal condition when the speed of the drive of the machine is retarded to such an extent that a cycle of one of said pulses becomes longer than a time equal to a sum of program execution times of the control and synchronizing routines.

6. A control system as claimed in claim 2, wherein the speed of the drive of the machine is lower than a speed occurring during a normal operation thereof and when a time cycle of one of said pulses is smaller than a time equal to a sum of program execution times of the control and synchronizing routines, said control routine is started in response to generation of the pulse during execution of the synchronizing routine.

7. In a control system for a copying machine having a number of cooperative components controlled by a computer including a drive motor, means for receiving an original document, means for scanning the original document, a photosensitive member capable of receiving an electrostatic image of an original document, means for providing copy paper and means for transferring the image to the copying paper, the improvement comprising:

means for generating timing pulses coordinate with operation of the drive motor, and programming means executable by the computer to drive the copying machine to make a copy of an original document including a control routine to effectuate a copying operation by coordinating components of the machine and a synchronizing routine for controlling implementation of the control routine, the synchronizing routine also being executed immediately after termination of a control program, however, the control program can be subsequently executed in response to a timing pulse generated during execution of the synchronizing routine, whereby a shorter startup time can be provided further including means for determining an abnormal operation of the drive motor by generating a time pulse indicative of operation of the drive motor and comparing the drive motor time pulses with a time period necessary for execution of the control and synchronizing routines wherein the machine is detected as operating in an abnormal condition when a speed of the drive of the machine is retarded to such an extent that a cycle of one of said pulses becomes longer than a time equal to a sum of program execution times of the control and synchronizing routines.

* * * * *